Patented June 24, 1930

1,768,071

UNITED STATES PATENT OFFICE

GEORG KALISCHER AND HEINZ SCHEYER, OF FRANKFORT-ON-THE-MAIN, AND PAUL NAWIASKY AND EMIL KRAUCH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

CONDENSATION PRODUCTS OF THE BENZANTHRONE SERIES AND PROCESS OF MAKING SAME

No Drawing. Application filed June 17, 1927, Serial No. 199,626, and in Germany June 28, 1926.

Our invention relates to new condensation products of the benzanthrone series of a hitherto unknown chemical constitution, which are obtained by treating Bz.1-nitro-2-methyl benzanthrone of the formula:

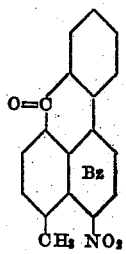

with acid condensing agents, such as fuming sulfuric acid, chlorosulfonic acid or a mixture of both or aluminium-chloride with or without addition of an indifferent solvent or diluent.

The condensation products thus obtained are when dry grey to black colored powders, practically insoluble in organic solvents, soluble in concentrated sulfuric acid to an olive solution. They yield with an alkaline solution of hydrosulfite a reddish colored vat and dye cotton therefrom greenish to bluish grey to black shades of a very good fastness. They may also be used as intermediates for the production of other dyestuffs.

We have further found that besides the aforesaid condensation products a by-product of reaction is obtained, which can be easily separated from the condensation product by heating the raw product with organic solvents. The by-product is easily soluble therein and may be isolated by crystallization or precipitation with suitable agents. According to its properties it seems to be the inner anhydride of the Bz.1-amino benzanthrone-2-carboxylic acid, which may be saponified to the free acid by means of alkaline acting agents. In consequence of these properties the by-product may also be isolated by boiling the raw products of reaction with dilute caustic soda solutions. By acidifying the alkaline solutions, thus obtained, and filtrating from the insoluble condensation product, immediately the free carboxylic acid is obtained. The quantity of the formed by-product depends from the conditions applied.

In order to further illustrate our invention the following examples are given, the parts being by weight and all temperatures in centigrade degrees, but it is understood, that our invention is not limited to the particular products or reacting conditions mentioned therein.

Example I 50 parts of Bz.1-nitro-2-methyl benzanthrone are introduced at 10° in about 250 parts of fuming sulfuric acid of 60% and the solution is stirred for a short time until the dyestuff formation is finished. The mass is then diluted by adding at 10–20° 250 parts of sulfuric acid of 90%. The mass is poured on ice and the separated product of reaction is filtered. It may be freed from the above mentioned by-product and some impurities by boiling it with dilute caustic soda solution. The new compound is practically insoluble in organic solvents, soluble in concentrated sulfuric acid with an olive green color. It forms with an alkaline solution of hydrosulfite a bluish red vat from which cotton is dyed grey shades of a good fastness.

Example II

At about −5 to 0° 10 parts of finely powdered Bz.1-nitro-2-methyl benzanthrone are quickly introduced into a mixture of about 100 parts of fuming sulfuric acid of 70% and 50 parts of chlorosulfonic acid and the mass is stirred for about ½ hour at the same temperature. Then it is poured into much water and the separated product of reaction is filtered and freed from the mineral acid by washing with water. The dyestuff thus obtained is similar in its properties to the product described in Example I.

For purifying the dyestuff is extracted with much glacial acetic acid until no more substance dissolves. From the concentrated glacial acetic acid solution the dissolved by-product of the reaction separates partly as a brownish precipitate; the separation is completed by adding water. The new compound may be recrystallized from nitrobenzene in little crystals, soluble in concentrated sulfuric acid with a green color and melting at 320°. It dissolves to a small degree in cold caustic soda solution with a green color and with a blue color in presence of a little pyridine. By boiling the product, which is assumed to be the inner anhydride of the Bz.1-amino benzanthrone-2-carboxylic acid, with a caustic soda solution of 5%, it is saponified to the free acid, which may be isolated by acidifying the alkaline solution. The brownish red precipitate forms when recrystallized from nitrobenzene brown microscopical crystals melting at 278°. The new compound is soluble in concentrated sulfuric acid with a green color in cold caustic soda solution with a reddish violet, when warmed with a reddish brown color.

*Example III*

A mixture of 10 parts of Bz.1-nitro-2-methyl-benzanthrone, 10 parts of finely powdered aluminium chloride and 100 parts of trichloro benzene is boiled for about 6 hours under reflux while well stirring. After cooling down the mass is diluted with water and the trichloro benzene is expelled with steam. The product of reaction is filtered off and is boiled with a dilute hydrochloric acid for totally removing the aliminium salts. The dyestuffs thus obtained corresponds in its properties to the dyestuff, described in Example I, but dyes cotton less greenish tint.

In order to obtain the new compound, described in the foregoing example and assumed to be the Bz.1-amino benzanthrone-2-carboxylic acid, the dyestuff of Example III may be extracted with a dilute caustic alkali solution and the alkaline solution thus obtained may be acidified.

We claim:

1. As new compounds condensation products of the benzanthrone series, being when dry grey to black colored powders, practically insoluble in organic solvents, soluble in concentrated sulfuric acid to an olive solution forming with an alkaline solution of hydrosulfite a reddish colored vat dyeing cotton therefrom greenish to bluish grey to black shades of a very good fastness, which products are substantially identical with those obtainable by treating Bz.1-nitro-2-methylbenzanthrone with acid condensing agents.

2. Process for producing new condensation products of the benzanthrone series which process comprises treating Bz.1-nitro-2-methylbenzanthrone of the formula:

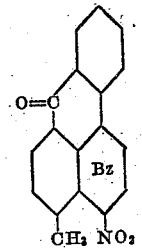

with acid condensing agents.

3. Process for producing new condensation products of the benzanthrone series which process comprises treating Bz.1-nitro-2-methylbenzanthrone of the formula:

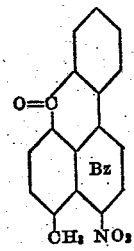

with acid condensing agents in presence of an indifferent diluent.

4. Process for producing new condensation products of the benzanthrone series which process comprises treating Bz.1-nitro-2-methylbenzanthrone of the formula:

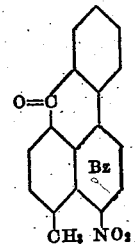

with fuming sulfuric acid.

In testimony whereof, we affix our signatures.

GEORG KALISCHER.
HEINZ SCHEYER.
PAUL NAWIASKY.
EMIL KRAUCH.